(12) United States Patent
Jahn

(10) Patent No.: US 9,476,791 B2
(45) Date of Patent: Oct. 25, 2016

(54) FIELD TESTABLE INSTRUMENT HOUSING CONNECTION

(71) Applicant: Halliburton Energy Services, Inc., Houston, TX (US)

(72) Inventor: Marion Robert Jahn, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 615 days.

(21) Appl. No.: 13/705,849

(22) Filed: Dec. 5, 2012

(65) Prior Publication Data

US 2014/0151998 A1    Jun. 5, 2014

(51) Int. Cl.
| | |
|---|---|
| F16L 19/07 | (2006.01) |
| G01M 3/02 | (2006.01) |
| G01M 13/00 | (2006.01) |
| G01M 3/28 | (2006.01) |

(52) U.S. Cl.
CPC .............. *G01M 3/022* (2013.01); *F16L 19/07* (2013.01); *G01M 3/2861* (2013.01); *G01M 13/005* (2013.01); *Y10T 29/49002* (2015.01)

(58) Field of Classification Search
CPC ... F16L 19/103; F16L 19/061; F16L 19/062; F16L 19/065; F16L 19/0653; F16L 19/0656; F16L 19/07; F16L 19/086; F16L 19/10; F16L 19/106; F16L 19/12; G01M 3/022; G01M 3/2861; G01M 13/005
See application file for complete search history.

(56) References Cited

U.S. PATENT DOCUMENTS

| | | | | |
|---|---|---|---|---|
| 3,552,781 A | * | 1/1971 | Helland | F16L 17/02 285/322 |
| 4,136,552 A | | 1/1979 | Hasha | |
| 4,871,196 A | * | 10/1989 | Kingsford | F16L 39/005 285/123.1 |
| 5,833,490 A | | 11/1998 | Bouldin | |
| 6,032,736 A | | 3/2000 | Williams | |
| 6,056,327 A | | 5/2000 | Bouldin et al. | |
| 7,219,736 B1 | | 5/2007 | Levy | |
| 7,784,838 B2 | | 8/2010 | Levy | |
| 8,037,933 B1 | | 10/2011 | Levy | |
| 8,176,612 B2 | | 5/2012 | Levy | |
| 8,186,202 B2 | | 5/2012 | Lafleur et al. | |
| 2003/0197379 A1 | * | 10/2003 | Glover | F16L 19/12 285/342 |
| 2008/0315582 A1 | | 12/2008 | Levy | |
| 2010/0201118 A1 | * | 8/2010 | Anton | F16J 15/064 285/93 |
| 2010/0289225 A1 | | 11/2010 | Lafleur et al. | |
| 2012/0153608 A1 | * | 6/2012 | Gill | E21B 33/038 285/1 |

FOREIGN PATENT DOCUMENTS

| | | |
|---|---|---|
| EP | 0544341 A2 | 6/1993 |
| GB | 2382365 A | 5/2003 |
| GB | 2430812 A | 4/2007 |
| WO | 2010135114 A2 | 11/2010 |

* cited by examiner

*Primary Examiner* — James Hewitt
*Assistant Examiner* — James Linford
(74) *Attorney, Agent, or Firm* — Michael A. Ervin; Krueger Iselin LLP

(57) ABSTRACT

A field testable instrument housing connection is made up of an integral instrument housing assembly that includes both an instrument housing and a separate one-piece compression nut portion and a separate modified reducing union. The instrument housing has a mating geometry that is disposed over the downhole portion of the separate modified reducing union and the separate one-piece compression nut portion is then disposed over both the uphole portion of the instrument housing and a downhole portion of the modified reducing union. The complete assembly of the modified reducing union, including primary and secondary seals in combination with the integral instrument housing assembly provide then both an annular seal and a seal of the instrument housing. The entire assembly is field testable via provided test ports.

2 Claims, 4 Drawing Sheets

FIELD TESTABLE INSTRUMENT HOUSING CONNECTION

CROSS-REFERENCE TO RELATED APPLICATIONS

Not applicable.

FIELD OF THE INVENTION

This disclosure relates generally to testable connections. More particularly to external field testing of multiple parallel seal-connections between concentric metal tubes and hermetically sealed instrument housings.

BACKGROUND OF THE INVENTION

There is widespread use of various metal tubing arrangements used to convey electrical or optical conductors to various measurement instruments installed in sealed housings. These sealed housings are often placed in extreme environments as for example, in wellbores used for oil and gas exploration.

There is a growing trend to use double wall concentric tubing in such applications, so that the outer tube provides a primary barrier against entry of fluids. The inner tubing that encapsulates electrical or optical conductors provides a secondary barrier in case of rupture of the outer tube.

Especially in the case of concentric tubes, when the outer tube is ruptured, high pressure well fluids can enter the cavity (annulus) around the inner tube and potentially contaminate instruments inside the instrument housings connected to the inner tube. So the annulus between the concentric tubes must be properly sealed from the instrument housing to prevent such contamination.

Because of the critical nature and cost of such systems, the industries that use them desire the ability of field-testing critical external seals that prevent the entry of wellbore fluids that would contaminate and disable such systems.

U.S. Pat. Nos. 7,219,736; 7,784,838; 8,037,933; 8,176,612; and 8,186,202 are prior art examples of systems which allow some testing of critical seals. These examples are based on simple tube connectors ("unions"), which provide for testing of primary seals against the outside diameter of the tubes. This approach will be explained further in the Detailed Description section. But the existing art does not provide testable connection of concentric, double-wall tubes, including annular seal, to hermetically sealed housings.

There is a need then for a field testable connection of such concentric, double-wall tubes, including annular seal, to hermetically sealed housings. The meeting of this need will be described.

BRIEF SUMMARY OF THE INVENTIVE CONCEPT

The need is met by a field testable instrument housing connection for field testing of multiple parallel seal connections between concentric tubes and hermetically sealed instrument housings including at least: a modified reducing union having a uphole portion and a downhole portion; with metal tube seals at each end, and with the uphole end metal tube seal having testable features; a concentric smaller tube passing from uphole to downhole completely through said modified reducing union; an outer concentric tube passing from uphole to downhole but terminating inside said modified reducing union; a compression nut portion through which said modified reducing union is inserted; an integral instrument housing assembly having an uphole and a downhole portion, with said uphole portion having a mating seal geometry on its uphole end and said uphole end disposed over the downhole end of said modified reducing union and within said compression nut portion; a metal seal against the modified reducing union body and located within said compression nut portion; wherein said mating seal geometry of said integral metal instrument housing mates with said metal seal against the modified reducing union body and said compression nut portion to form a metal hydraulic seal against the modified reducing union body; an uphole test seal element and a downhole test seal element positioned on either side of said metal seal against the modified reducing union body; a test port positioned between said uphole test element and said metal seal against the outer metal tubular body.

The need is further met by a method for making an externally testable connection of multiple parallel seal connections between inner and outer concentric tubes, the inner tubes carrying electrical and/or optical conductors to be connected to instruments, and a hermetically sealed instrument housing, the connection comprising a jam nut, a double jam nut, a modified reduction union, a compression nut with a test port and a test port plug, and an instrument housing; wherein the method comprises the steps of: trimming back outer concentric tube to expose sufficient length of the inner concentric tube to pass completely through a reducing union and to additionally provide sufficient length of conductors for connection to devices inside of said instrument housing; sliding a jam nut over said outer tube; sliding ferrules over said outer tube; sliding a double jam nut onto said outer tube, wherein the double jam nut comprises a test port with a test port plug and a double jam seal; insert both inner and out concentric tubes into said reducing union, passing said inner concentric tube completely through said reducing union, and terminating said outer tube inside said reducing union; threadably engaging the jam nut into the double jam nut while maintaining the ferrule between the jam nut and the double jam nut; sliding annular seal over inner concentric tube; sliding threadably engageable smaller jam nut over inner tube and tighten into reducing union to tightly squeeze seal into the space between inner tube and reducing union body, thereby establishing tight seal across annulus; installing upper test seal between reducing union body and compression nut; sliding compression nut over end of modified reducing union; tightening the jam nut, compressing the ferrule, and deforming the ferrule into the double jam nut while deforming the ferrule into the tube creating a portion of a secondary seal; sliding metal seals over the end of the modified reducing union body; attaching the electrical and/or optical conductors inside the inner tube to instruments or other apparatuses to be contained in said instrument housing; installing test seal onto instrument housing; sliding instrument housing over instruments and inner tube; engaging instrument housing over the downhole end of modified reducing union body and within compression nut portion; threadably engaging compression nut over the instrument housing and threadably engaging the double jam nut into the female portion of reducing union to deform the cone of the outer tube while maintaining the ferrule between the jam nut and the double jam nut; removing the test port plugs of test ports and; connecting a pressure generating device to each of the test ports; evaluating integrity of the primary seal and the secondary seal; bleeding the pressure; reinstalling the test port plugs; and running the complete field testable instrument housing connector into the well.

DETAILED DESCRIPTION OF THE INVENTION

In the following detailed description, reference is made to accompanying drawings that illustrate embodiments of the present invention. These embodiments are described in sufficient detail to enable a person of ordinary skill in the art to practice the invention without undue experimentation. It should be understood, however, that the embodiments and examples described herein are given by way of illustration only, and not by way of limitation. Various substitutions, modifications, additions, and rearrangements may be made without departing from the spirit of the present invention. Therefore, the description that follows is not to be taken in a limited sense, and the scope of the present invention is defined only by the appended claims.

Figure 1:
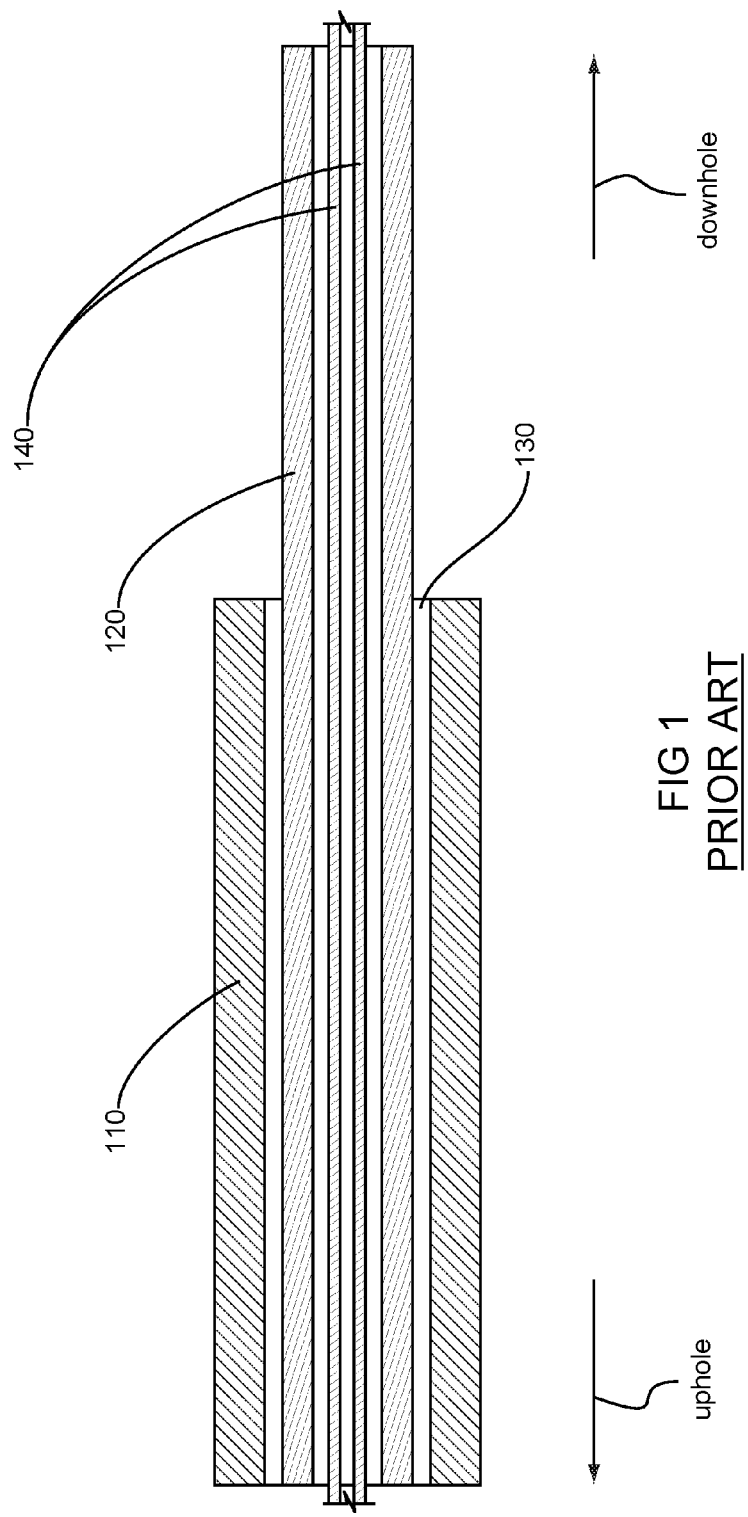
FIG. 1 illustrates an overview of concentric outer and inner tubes that are used for conveying electrical and optical conductors to sealed instrument housings or other devices deployed in oil or gas wells downhole.

FIG. 1 exhibits concentric double-walled tubing used to convey electrical and optical conductors downhole, eventually to an instrument housing. An inner tube 120 carries all of the electrical and optical conductors 140 downhole toward an instrument housing. Along the length of inner tube 120 an outer tube 110 surrounds and protects the inner tube 120 and the conductors 140 contained therein. The space 130 between the inner and outer tubes will be referred to as the annulus. If the outer tube is ever breached then formation fluids could enter and travel down this annulus and potentially contaminate the instrument housing. The annulus must be sealed to prevent any contamination of the instrument housing. Additionally there is a need, mentioned previously, to test the external sealing system to validate the performance of the seals. But there is also a need to prevent any contamination at the connection between the inner tube and the instrument housing.

Prior art approaches can be used to address part of these needs. They tend to be based on simple tube connectors or "reducing unions" that provide for testing of primary seals against the outside diameters of the tubes.

Figure 2:
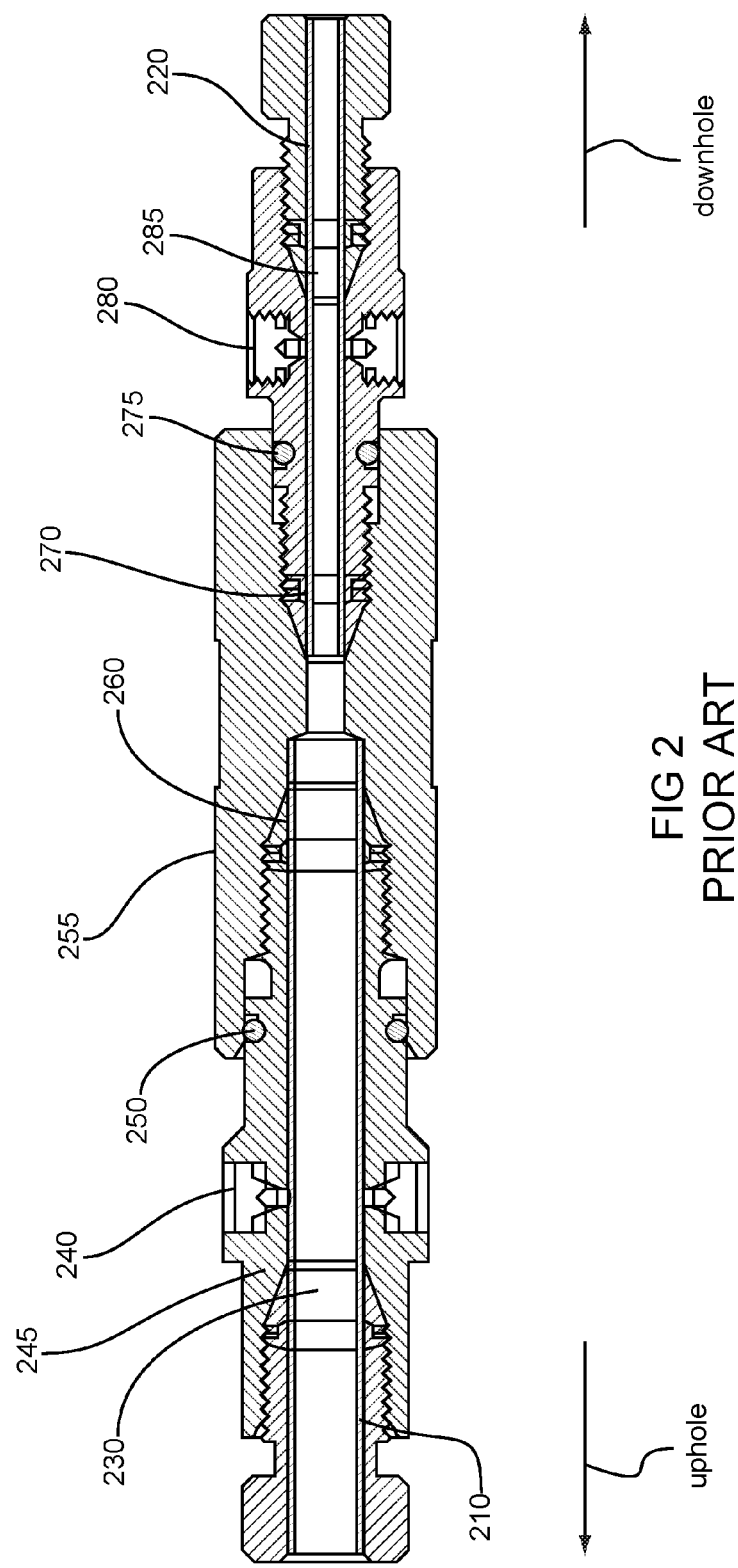
FIG. 2 is a prior art example of the use of a reducing union to join and seal a smaller tube to a larger tube.

FIG. 2 exhibits one such prior art approach, in this case by the use of testable "reducing unions". The example in FIG. 2 is a testable reducing union, shown in its conventional application, used to connect smaller to larger sections of tubing for the purpose of establishing continuous flow or communication through both tubes. The larger tubing 210 is shown coming in from the uphole side and entering the assembly, which includes a double jam nut 245 with testable features, including an integral test port 240. A reducing union 255 connects the double jam nut 245 and its included larger tube 210 with the smaller tube 220. Seals 260 and 270 provide primary protection against outside fluids entering the tubing. Test port 240 allows application of pressure for testing of the primary seal 260 between the large tube 210 and the union body 255. Test seals provided at 230 and 250 contain the pressure applied for testing of the primary seal 260. A second testable port 280 between test seals 275 and 285 allows application of pressure for testing of the primary seal 270 between the smaller tube 220 and the union body 255.

Figure 3:
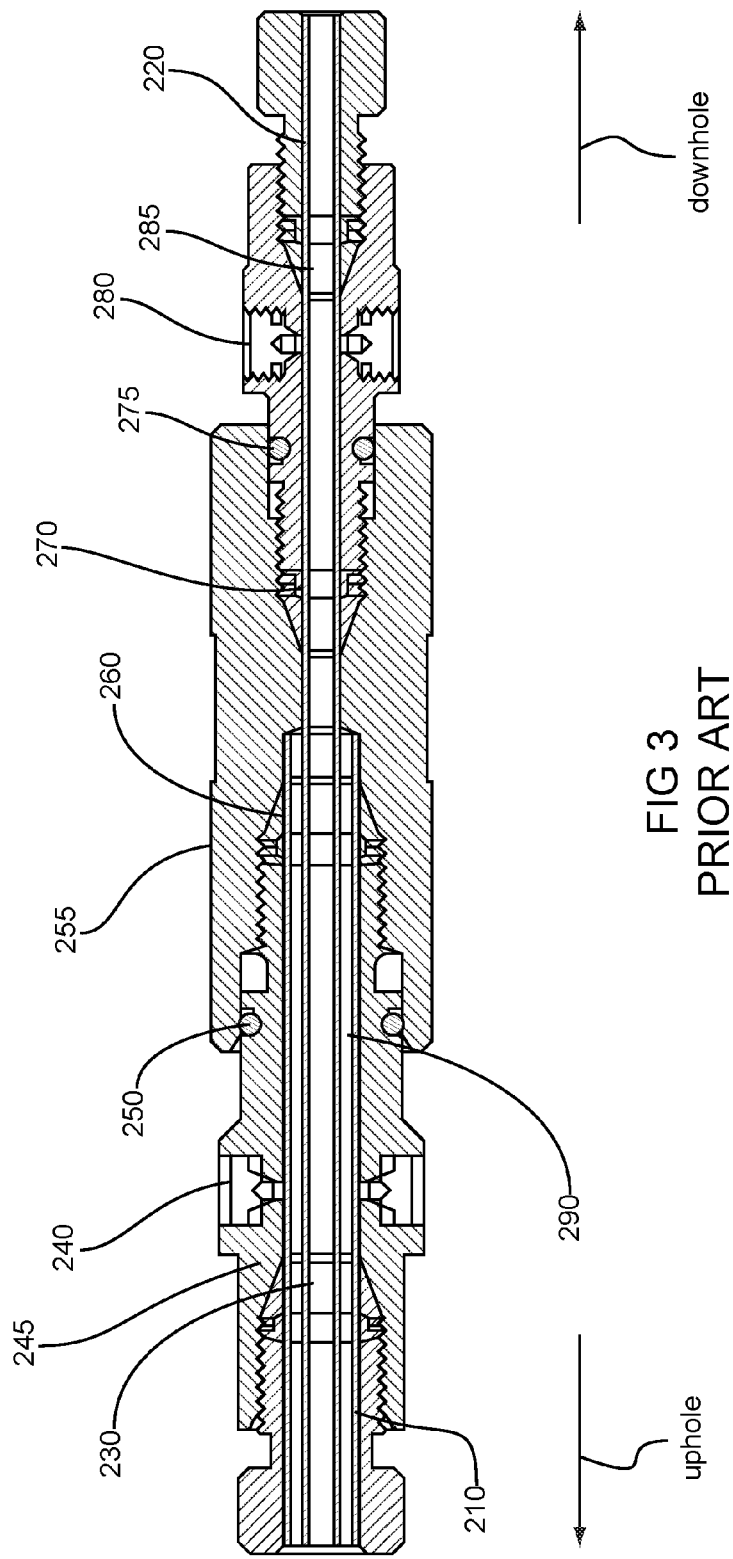
FIG. 3 is a prior art example of the use of a reducing union to establish a seal across the annulus between concentric (larger/smaller) sections of tubing at the termination end of the larger tube.

Of more immediate interest for the use of instrument housings is the application of the reducing union concept of FIG. 2 to establish a seal across the annulus between concentric (larger/smaller) sections of tubing. FIG. 3 illustrates this approach using a reducing union 255 for the case in which the inner tubing 220 passes completely through the reducing union. The outer tube 210 enters the reducing union 255 from uphole but terminates inside the reducing union. In this configuration, the combination of seals 260 and 270 provide an effective annular seal to prevent the passage of fluids that may escape the annular space between outer tube 210 and inner tube 220.

This annular-seal configuration can protect downhole assets such as an instrument housing connected to inner tube 220.

Figure 4:
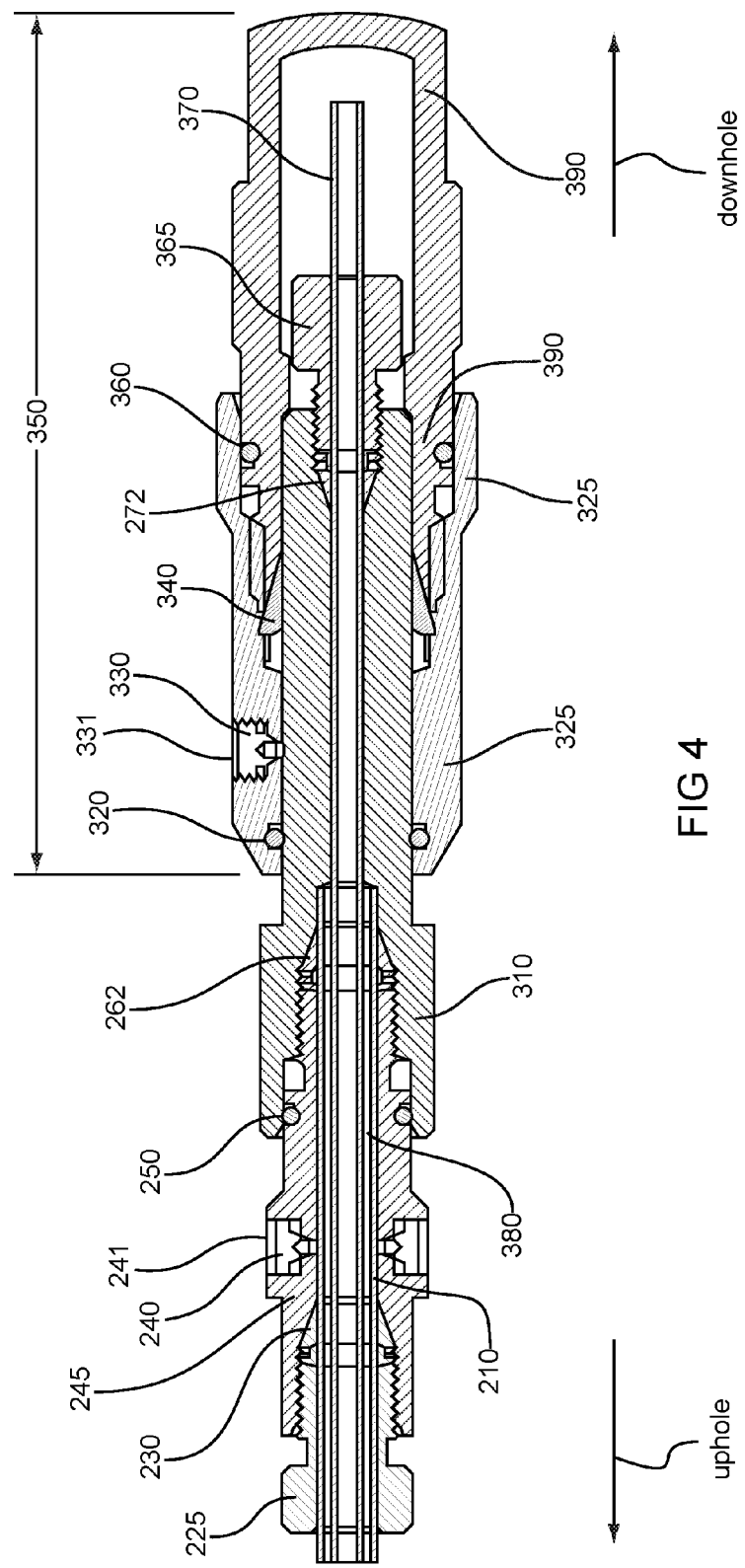
FIG. 4 illustrates the disclosure of this application, a field testable instrument housing connection mated to a modified reducing union similar to that of FIG. 3.

FIG. 4 is an illustration of the field testable instrument housing of this disclosure. It is a combination of a modified version of the FIG. 3 approach to create a novel instrument housing mating system. Referring now to FIG. 4, the downhole side of the reducing union of FIG. 3 is shown in this embodiment without the downhole test port 280 and test seals 275 and 285.

The downhole portion of reducing union 310 is modified to fit into an integral instrument housing mating assembly 350 comprising a compression nut 325 and the instrument housing itself 390. The modified reducing union 310 has an uphole portion that lies outside of integral instrument housing mating assembly 350 and a downhole portion that surrounds a concentric inner metal tube 370 that passes from the uphole side completely through the double jam nut 245, the modified reducing union 310 and the instrument housing mating system 350 and feeds optical and electrical conductors to the interior of the instrument housing 390. An outer concentric tube 210 surrounds the inner metal tube 370 on the uphole side and creates an annulus 380 between the outer 210 and inner 370 metal tubes. The outer concentric tube passes through 210 terminates in the modified reducing union outside of the integral housing mating assembly 350 and includes a metal seal element 262 against the outer diameter of outer tube 210. The modified reducing union 310 including inner metal tube 370 is inserted through a compression nut portion 325. Instrument housing 390 has an uphole end and a downhole end and the uphole end has mating seal geometry so that it is mated over the downhole end of the modified reducing union body 310 and within compression nut portion 325. A metal seal 340 is formed onto modified reducing union 310 when the mating seal geometry of instrument housing 390 is pressed against metal seal 340 by the action of compression nut 325. The combination of the mating seal geometry, the metal seal 340 and the compressing action of the compression nut 325 forms a hydraulic seal against modified reducing union 310 and the uphole end of housing 390. This sealing arrangement provides a seal against formation fluids entering the inside of instrument housing 390.

Testable features are provided with the compression nut 325. An uphole test seal 320 and a downhole test seal 360 are positioned on either side of metal seal 340 and a test port 330 is positioned between upper test seal element 320 and metal seal 340. Pressure is applied to test port 330 in order to simultaneously test for the integrity of primary housing seal 340.

The modified reducing union 310 has primary seal 262 on its uphole end and a secondary seal 272 on its downhole end that have the same design as seals 260 and 270 of FIG. 3. The complete assembly of the modified reducing union 310, including primary seals 262 and secondary seal 272, in combination with the integral instrument housing assembly 350 provide then both an annular seal and a seal of the instrument housing 340. And the entire assembly is field testable via test ports 240 and 330. Both test ports 240 and 330 normally have test port plugs 241, 331 in place during normal operation. The test port plugs are removed for testing purposes.

In another embodiment (not shown) the downhole test port 280 and test seals 275 and 285 of FIG. 3 could have been included in modified reducing union 310 in FIG. 4 if testing of the seal against smaller tube 370 was required.

In operation the field testable instrument housing connection for field testing of multiple parallel seal connections between inner 210 and outer 370 concentric tubes, the inner tubes carrying electrical and/or optical conductors to be connected to instruments, and a hermetically sealed instrument housing 390 is assembled for use and installed in a well as follows.

The method comprises the steps of: first trimming back the outer concentric tube 370 to expose sufficient length of the inner concentric tube 210 to pass completely through a reducing union 310 and to additionally provide sufficient length of conductors for connection to devices inside of the instrument housing 390; then sliding a jam nut 225 over the outer tube; sliding ferrules over the outer tube; sliding a double jam nut 245 onto the outer tube, wherein the double jam nut comprises a test port 240 with a test port plug and a double jam seal 250; sliding seal 262 over the outer tube; insert both inner and out concentric tubes into reducing union 310, passing the inner concentric tube completely through the reducing union, and terminating the outer tube inside the reducing union; threadably engaging the jam nut into the double jam nut while maintaining the ferrule between the jam nut and the double jam nut; sliding annular seal 272 over inner concentric tube; sliding threadably engageable smaller jam nut 365 over inner tube 370 and tighten into reducing union 310 to tightly squeeze seal 272 into the space between inner tube 370 and reducing union 310 body, seals 262 and 272 thereby establishing tight seal across annulus; installing upper test seal 320 between reducing union 310 body and compression nut 325; sliding compression nut 325 over end of modified reducing union 310; sliding metal seals 340 over the end of the modified reducing union 310 body; tightening the jam nut 365, compressing the ferrule, and deforming the ferrule into the double jam nut while deforming the ferrule into the tube creating a portion of a secondary seal; attaching the electrical and/or optical conductors inside the inner tube to instruments or other apparatuses to be contained in the instrument housing 390; installing lower test seal 360 onto instrument housing 390; sliding instrument housing 390 over instruments and inner tube; engaging instrument housing 390 over the downhole end of modified reducing union 310 body and within compression nut portion 325; threadably engaging compression nut 325 over the instrument housing 390 and threadably engaging the double jam nut 245 into the female portion of reducing union 310 to deform the cone of the outer tube 210 while maintaining the ferrule between the jam nut and the double jam nut; removing the test port plugs of test ports 240 and 330; connecting a pressure generating device to each of the test ports; evaluating integrity of the primary seal and the secondary seal; bleeding the pressure; reinstalling the test port plugs; and running the complete field testable instrument housing connector into the well.

The pressure generating device used to connect to the test ports and test the system may be a test pump that uses gasses or fluids. The step of evaluating integrity of the primary seal and the secondary seal utilizes a test fluid selected from the group consisting of nitrogen, helium, another gas, water, and a hydraulic fluid.

Although certain embodiments of the present invention and their advantages have been described herein in detail, it should be understood that various changes, substitutions and alterations can be made without departing from the spirit and scope of the invention as defined by the appended claims. Moreover, the scope of the present invention is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufactures, means, methods or steps.

The invention claimed is:

1. A field testable instrument housing connection for field testing of multiple parallel seal connections between outer (210) and inner (370) concentric tubes, the inner tubes carrying electrical or optical conductors to be connected to sealed instruments, the field testable instrument housing connection comprising:
   a. a hermetically sealed metal instrument housing (390);
   b. a modified reducing union (310) having an uphole portion, a downhole portion and a middle portion; with an uphole end metal tube seal (262) and a downhole end metal tube seal (272) which provides both an annular seal and a seal of the metal instrument housing, with the uphole end metal tube seal having means for testing seal integrity, wherein the middle portion and the downhole portion have an outer diameter that is smaller than the outer diameter of the uphole portion;
   c. a concentric inner tube (370) passing from uphole to downhole completely through said modified reducing union;
   d. an integral instrument housing assembly (350) comprising:
      i. the metal instrument housing (390) having an uphole and a downhole portion, with said uphole portion having a mating seal geometry on its uphole end so that said uphole end is disposed over the downhole portion of said modified reducing union;
      ii. a separate one-piece compression nut (325) having an uphole and a downhole portion, and having means for testing seal integrity in the uphole portion, including a test port (330) with a test port plug (331) built into the separate one-piece compression nut, with said downhole portion of the separate one-piece compression nut having a mating geometry on the downhole end so that it is mated over the uphole end of the metal instrument housing and said downhole portion having a mating geometry so that it is mated over the middle portion of the modified reducing union;

e. an outer concentric tube surrounding said concentric inner tube passing from uphole to downhole but terminating inside an uphole portion of the modified reducing union that lies outside of the integral instrument housing assembly (350);

f. a metal seal (340) abutting against the modified reducing union and located within said separate one-piece compression nut;

g. wherein said mating seal geometry of said metal instrument housing mates with said metal seal (340) against the modified reducing union and within the downhole portion of the separate one-piece compression nut to form a metal hydraulic seal against the modified reducing union body;

h. an uphole test seal element (320) and a downhole test seal element (360) provided within the separate one-piece compression nut and positioned on either side of metal seal (340) against the modified reducing union body;

i. the test port (330) provided within the uphole portion of the separate one-piece compression nut and positioned between said uphole test seal element (320) and said metal seal (340) against the modified reducing union body.

2. The field testable instrument housing connection of claim 1 wherein said means for testing seal integrity of the uphole end metal tube seal of the modified reducing union comprise a test port (240) with a test port plug (241) and a double jam seal (250).

* * * * *